US007457519B2

(12) United States Patent
Dang et al.

(10) Patent No.: US 7,457,519 B2
(45) Date of Patent: Nov. 25, 2008

(54) SET-TOP BOX INTEGRATION OF INTEGRATED DRIVE ELECTRONICS

(75) Inventors: Cynthia Dang, Cerritos, CA (US); Jason Monroe, Ladera Ranch, CA (US); Tarek Kaylani, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1188 days.

(21) Appl. No.: 10/317,091

(22) Filed: Dec. 12, 2002

(65) Prior Publication Data

US 2003/0190140 A1    Oct. 9, 2003

Related U.S. Application Data

(60) Provisional application No. 60/369,346, filed on Apr. 3, 2002.

(51) Int. Cl.
*H04N 5/91* (2006.01)
(52) U.S. Cl. ............................................. 386/83; 386/46
(58) Field of Classification Search .................. 386/46, 386/94; 725/32, 81, 89, 64, 86; 715/716; 709/203, 330; 341/51; 370/477, 231; 358/1.15; 348/552, E7.071; 380/233, 210, 255; 714/37; 473/70; 711/112, 162; 700/94; 345/629, 345/630, 611; 361/685
See application file for complete search history.

(56) References Cited

U.S. PATENT DOCUMENTS 5,745,785 A    4/1998  Shoji et al.
5,842,929 A *  12/1998 Moody et al. ................. 473/70
6,118,763 A *  9/2000  Trumbull ..................... 370/231
6,208,273 B1 * 3/2001  Dye et al. ....................... 341/51
6,429,903 B1 * 8/2002  Young .......................... 348/552
6,434,748 B1 * 8/2002  Shen et al. ..................... 725/89
6,473,804 B1 * 10/2002 Kaiser et al. ................. 709/245
6,476,825 B1 * 11/2002 Croy et al. ................... 715/716
6,629,184 B1 * 9/2003  Berg et al. ................... 710/306
6,694,200 B1 * 2/2004  Naim ........................... 700/94
6,708,251 B1 * 3/2004  Boyle et al. ................. 711/112
6,721,176 B2 * 4/2004  Kwong et al. ............... 361/685
6,826,715 B1 * 11/2004 Meyer et al. ................. 714/37
6,922,739 B2 * 7/2005  Core ........................... 710/22
6,925,180 B2 * 8/2005  Iwamura ...................... 380/37
7,095,854 B1 * 8/2006  Ginter et al. ................ 380/233

(Continued)

FOREIGN PATENT DOCUMENTS

EP    0 923 232    6/1999

(Continued)

OTHER PUBLICATIONS

Pekowsky et al., "The Set-Top Box As Multi-Media Terminal", *IEEE Transactions On Consumer Electronics*, IEEE Inc., Jun. 2, 1998, pp. 308-309.

(Continued)

*Primary Examiner*—Prabodh Dharia
(74) *Attorney, Agent, or Firm*—Sterne, Kessler, Goldstein & Fox P.L.L.C.

(57) ABSTRACT

A system for implementing personal video recording, in which integrated drive electronics are incorporated in set-top box logic, instead of with a hard disk drive. This allows the set-top box logic to communicate directly to the hard disk, so that no intervening bus is necessary.

11 Claims, 3 Drawing Sheets

U.S. PATENT DOCUMENTS

| | | | |
|---|---|---|---|
| 7,228,394 B1* | 6/2007 | Herzig | 711/162 |
| 2001/0038642 A1* | 11/2001 | Alvarez et al. | 370/477 |
| 2002/0009283 A1 | 1/2002 | Hidetoshi et al. | |
| 2002/0061185 A1* | 5/2002 | Hirabayashi et al. | 386/94 |
| 2002/0067829 A1* | 6/2002 | Ficco | 380/210 |
| 2002/0071139 A1* | 6/2002 | Janik | 358/1.15 |
| 2002/0124250 A1* | 9/2002 | Proehl et al. | 725/32 |
| 2002/0157099 A1* | 10/2002 | Schrader et al. | 725/51 |
| 2002/0157101 A1* | 10/2002 | Schrader et al. | 725/64 |
| 2002/0161934 A1* | 10/2002 | Johnson et al. | 709/330 |
| 2003/0026424 A1* | 2/2003 | McGarrahan et al. | 380/255 |
| 2003/0059047 A1* | 3/2003 | Iwamura | 380/201 |
| 2003/0110503 A1* | 6/2003 | Perkes | 725/86 |
| 2003/0172317 A1 | 9/2003 | Tsunehiro et al. | |
| 2004/0255326 A1* | 12/2004 | Hicks et al. | 725/81 |
| 2005/0078944 A1* | 4/2005 | Risan et al. | 386/94 |
| 2005/0210101 A1* | 9/2005 | Janik | 709/203 |

FOREIGN PATENT DOCUMENTS

| | | |
|---|---|---|
| EP | 0 954 173 | 11/1999 |
| WO | WO 01/61697 | 8/2001 |

OTHER PUBLICATIONS

Pekowsky et al., "The Set-Top Box As Multi-Media Terminal", *IEEE Transactions On Consumer Electronics*, IEEE Inc., vol. 44, No. 3, Jun. 1998, pp. 833-840.

Copy of European Search Report issued in EP 03 00 7697 on Apr. 19, 2004, 4 pages.

* cited by examiner

SET-TOP BOX INTEGRATION OF INTEGRATED DRIVE ELECTRONICS

This non-provisional patent application claims priority to U.S. Provisional Patent Application No. 60/369,346, filed Apr. 3, 2002, which is incorporated herein by reference in its entirety.

BACKGROUND OF THE INVENTION

1. Field of the Invention

The invention described herein relates to video recording.

2. Background Art

Set-top boxes are now commonly used to allow television viewers the opportunity to control both what they view and how they view it. Some set-top boxes now support video cassette recorder (VCR)-like functions. Such functions are sometimes known as personal video recording (PVR) features. These functions include the recording of video, the creation and saving of viewer preferences, and the manipulation of live television. The latter permits a user to pause, rewind, view an instant replay, and view a replay in slow motion, for example.

To implement PVR features, video streams are typically recorded on a video memory medium such as a hard disk drive for subsequent playback. This is illustrated in FIG. 1. Hard disk 110 is used to record video information. Hard disk 110 includes integrated drive electronics (IDE) 120. IDE 120 is a hardware interface used to connect a peripheral device (i.e., hard disk 110) to external logic. In the system of FIG. 1, hard disk 110 is connected, via IDE 120, to set-top box logic 130. Set-top box logic 130 decodes a cable signal and accepts other signals corresponding to user inputs. Set-top box logic can be implemented as one or more integrated circuits. Note that information passing between set-top box logic 130 and IDE 120 typically passes through a peripheral component interconnect (PCI) bus 140.

This arrangement is both complex and inefficient. IDE 120 is collocated with hard disk 110, remote from set-top box logic and communications between IDE 120 and set-top box logic 130 necessarily pass through PCI bus 140. Hence there is a need for a system wherein set-top box logic and a hard disk can communicate using a minimum number of components, so as to simplify and improve the efficiency of set-top box operations.

BRIEF SUMMARY OF THE INVENTION

In the invention described herein, integrated drive electronics are incorporated in the set-top box logic. This allows the set-top box logic to communicate directly to a hard disk, so that the intervening PCI bus becomes unnecessary.

The foregoing and other features and advantages of the invention will be apparent from the following, more particular description of a preferred embodiment of the invention, as illustrated in the accompanying drawings.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the left-most digit(s) in the reference number.

DETAILED DESCRIPTION OF THE INVENTION

A preferred embodiment of the present invention is now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

In the invention described herein, integrated drive electronics are incorporated in the set-top box logic. This allows the set-top box logic to communicate directly to a hard disk, so that the intervening PCI bus becomes unnecessary.

Figure 1:
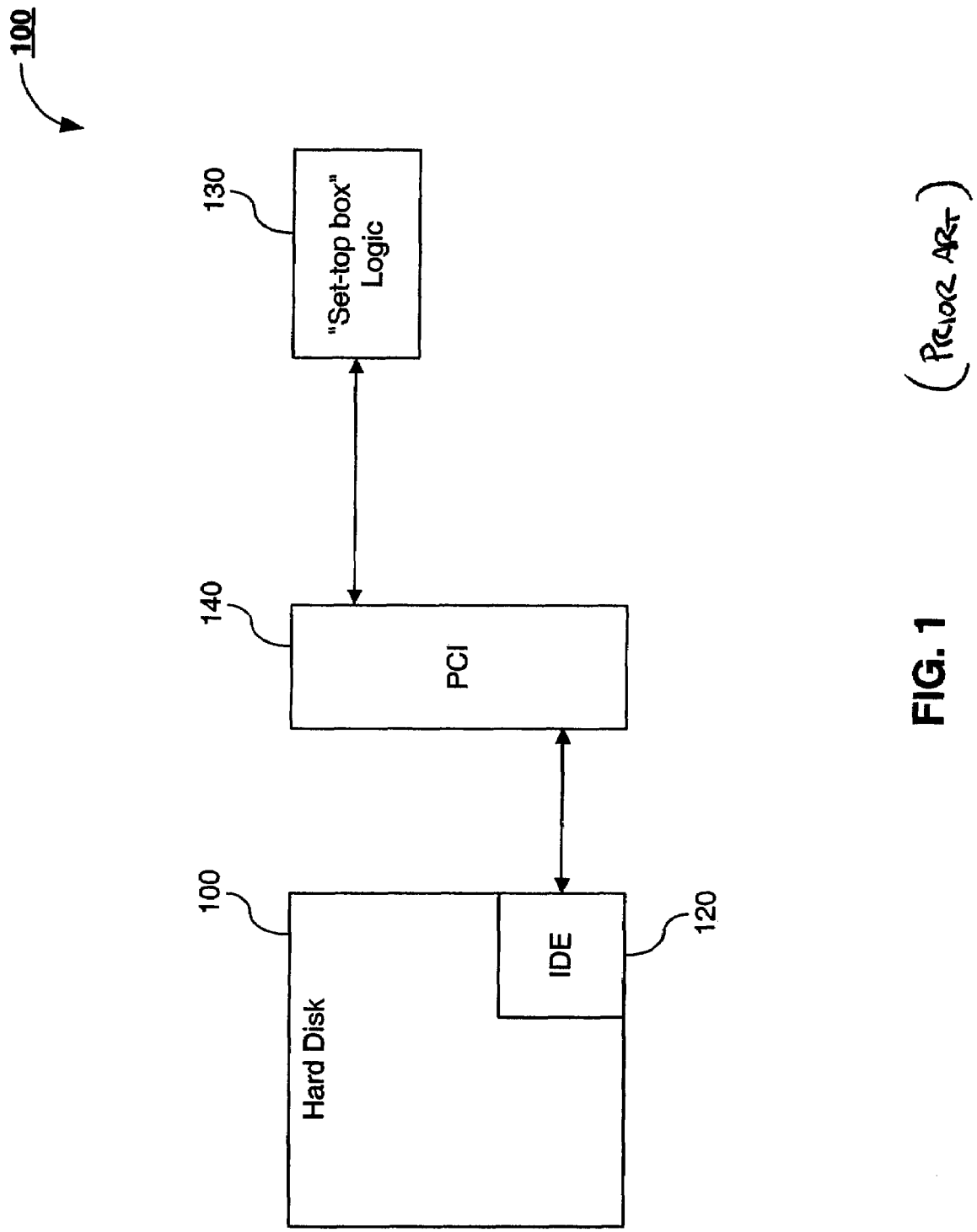
FIG. 1 is a block diagram showing the interconnection between set-top box logic and a hard disk, wherein the hard disk includes integrated drive electronics.
Figure 2:
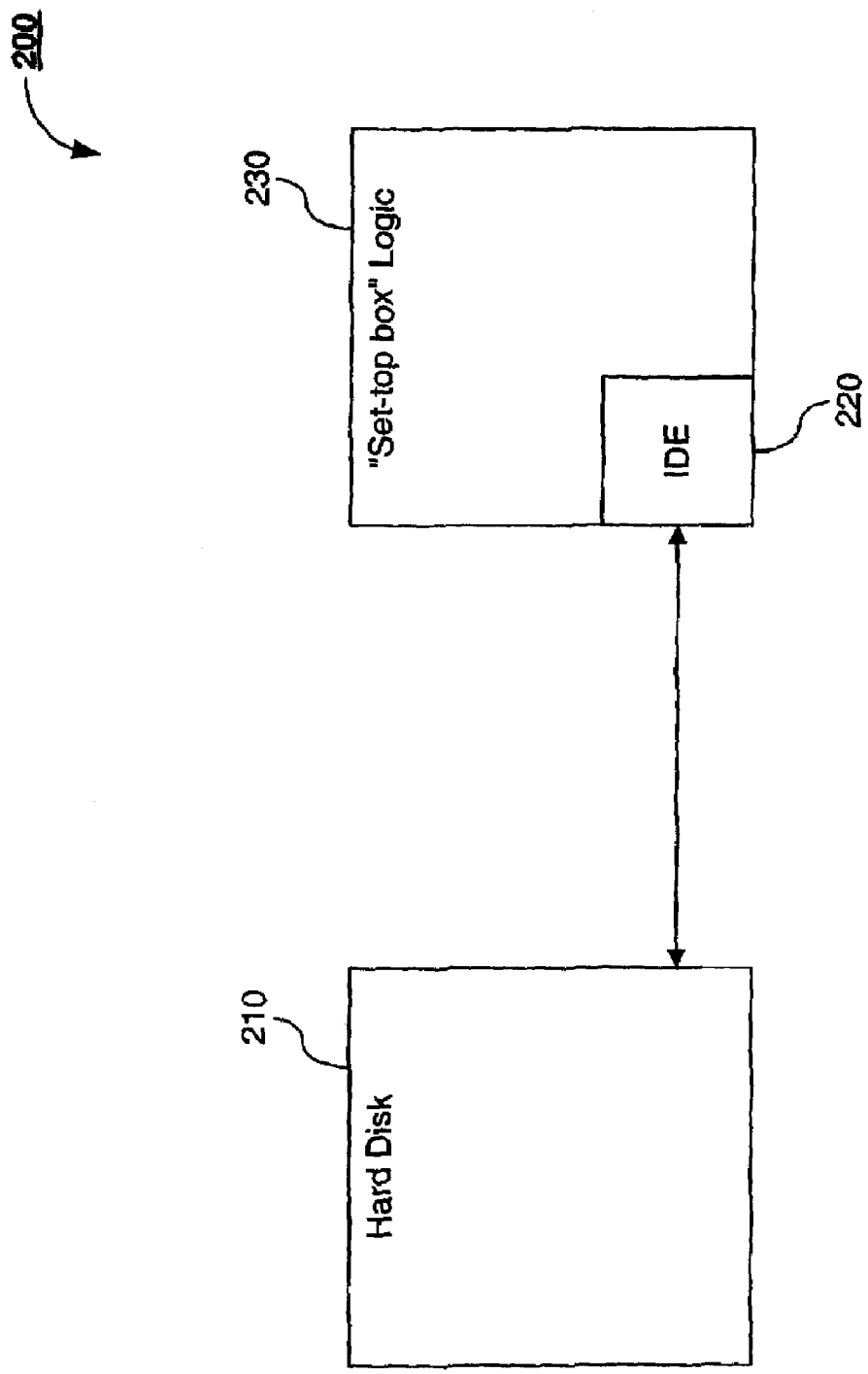
FIG. 2 is a block diagram showing the integration of integrated drive electronics in the set-top box logic, according to an embodiment of the invention.

FIG. 2 illustrates the system of the invention generally. Hard disk 210 is shown in communication with set-top box logic 230. As described above, set-top box logic decodes a cable signal and accepts other signals corresponding to user inputs. Set-top box logic can be implemented as one or more integrated circuits. Set-top box logic 230 includes IDE 220. IDE 220 represents the interface to hard disk 210. Because IDE 220 is incorporated in set-top box logic 230, information passes directly between set-top box logic 230 and hard disk 210 need not pass through a PCI bus.

Figure 3:
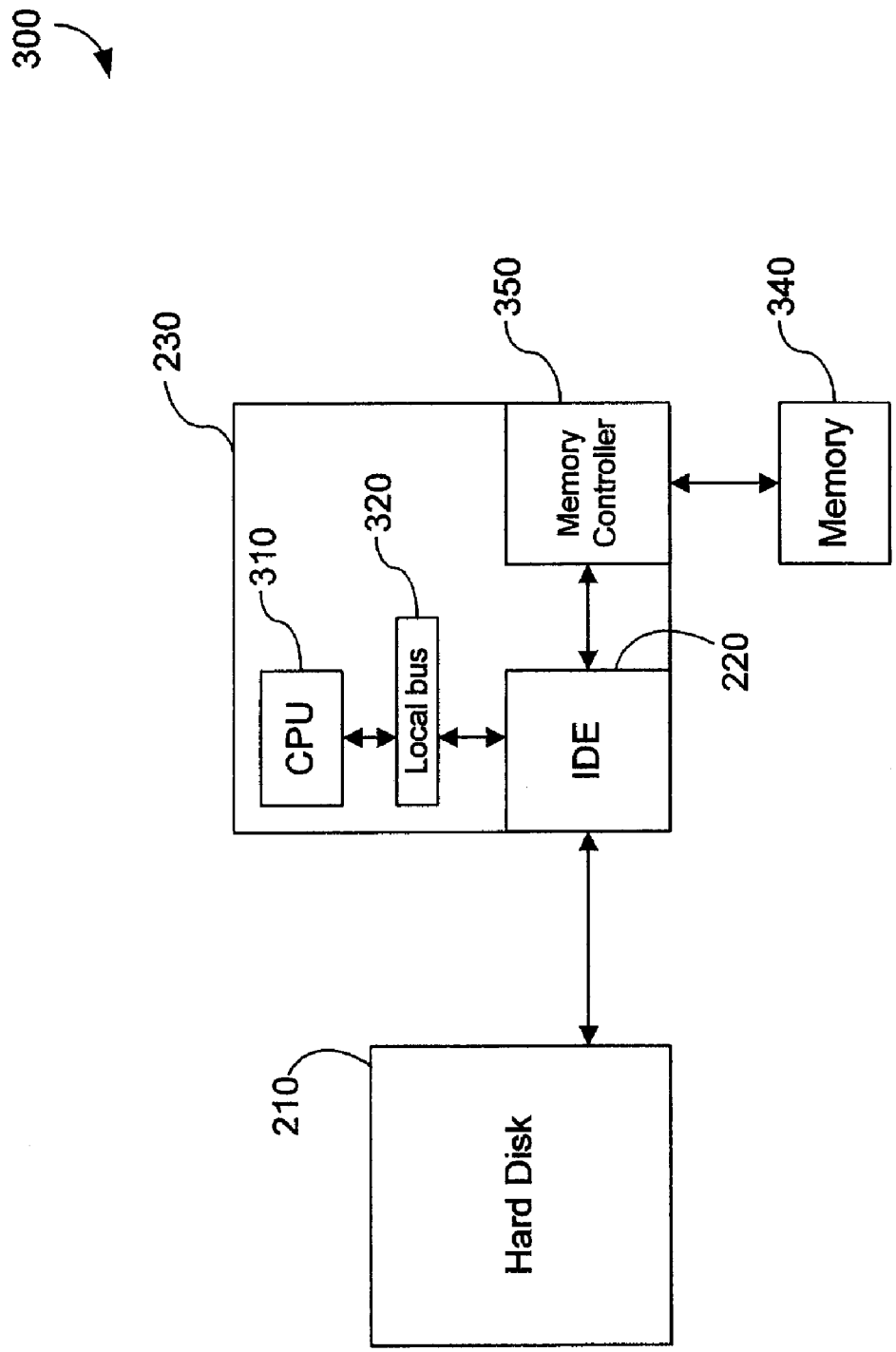
FIG. 3 illustrates set-top box logic in greater detail, according to an embodiment of the invention.

FIG. 3 illustrates set-top box logic 230 in greater detail. Set-top box logic 230, as discussed above, includes IDE 220. IDE 220 is in communication with hard disk drive 210. IDE 220 receives control and configuration information from a central processing unit (CPU) 310. In an embodiment of the invention, communications between CPU 310 and IDE 220 pass through a local bus 320. IDE 220 is also connected to memory controller 350. Memory controller 350 allows IDE 220 to communicate as necessary with external memory 340. Set-top box logic 230 can be implemented as one or more integrated circuits.

As a result of this architecture, video streams can now be recorded to and played back from the hard disk drive directly. The PCI bus has been eliminated. Likewise, the IDE external to the set-top box logic has been eliminated, and is integrated into the set-top box logic itself.

Note that in general, IDE can be used for memory devices other than a hard disk, such as a tape drive or a CD ROM drive. In other embodiments of the invention, the set-top box may use a video memory medium other than a hard disk, provided that the video memory medium has sufficient speed and capacity. The invention described herein can be used in any context where IDE is necessary to allow set-top box logic to access a video memory medium.

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments.

What is claimed is:

1. A system for personal video recording, comprising:
a video memory medium; and
set-top box logic,
wherein said set-top box logic comprises integrated drive electronics that interface said set-top box logic directly with said video memory medium without a bus and without any intervening logic for processing between said video memory medium and said integrated drive electronics, both said set-top box logic and said integrated drive electronics residing on a single integrated circuit.

2. The system of claim 1, wherein said set-top box logic further comprises a central processing unit.

3. The system of claim 2, wherein said set-top box logic further comprises a local bus, such that said central processing unit and said integrated drive electronics communicate through said local bus.

4. The system of claim 1, further comprising an external memory.

5. The system of claim 4, wherein said set-top box logic further comprises a memory controller that controls access of said set-top box logic to said external memory.

6. The system of claim 1, wherein said video memory medium comprises a hard disk.

7. Set-top box logic comprising integrated drive electronics, both the set-top box logic and the integrated drive electronics integrated in a single integrated circuit, wherein said integrated drive electronics enable the set-top box logic to be directly connected to a video memory medium without a bus and without any intervening logic for processing between said video memory medium and said integrated drive electronics.

8. The set-top box logic of claim 7, wherein said set-top box logic comprises a central processing unit.

9. The set-top box logic of claim 8, further comprising a local bus, such that said central processing unit and said integrated drive electronics communicate through said local bus.

10. The set-top box of claim 7, wherein said set-top box logic comprises a memory controller that controls access of said set-top box logic to an external memory.

11. The set-top box logic of claim 7, wherein said video memory medium comprises a hard disk.

* * * * *